US006494995B1

(12) United States Patent
Battah

(10) Patent No.: US 6,494,995 B1
(45) Date of Patent: Dec. 17, 2002

(54) SOLAR DISTILLATION SYSTEM

(76) Inventor: Hammam Jamil Girgiess Battah, 20200 Fenton St., Detroit, MI (US) 48219

( * ) Notice: Subject to any disclaimer, the term of this patent is extended or adjusted under 35 U.S.C. 154(b) by 0 days.

(21) Appl. No.: 09/432,016

(22) Filed: Nov. 2, 1999

Related U.S. Application Data

(63) Continuation-in-part of application No. 08/989,538, filed on Dec. 12, 1997, now abandoned.

(51) Int. Cl.[7] .............................. B01D 3/10; C02F 1/14
(52) U.S. Cl. ...................... 202/234; 159/16.1; 159/904; 159/DIG. 16; 202/176; 202/205; 203/11; 203/49; 203/91; 203/100; 203/DIG. 1; 203/22
(58) Field of Search ................................ 159/904, 903, 159/DIG. 16, 16.1; 202/234, 205, 267.1, 176; 203/22, 27, 10, 11, DIG. 1, DIG. 17, 100, 49, 91

(56) References Cited

U.S. PATENT DOCUMENTS

| | | | | |
|---|---|---|---|---|
| 2,412,466 A | * | 12/1946 | Miller, Jr. ................... | 202/234 |
| 2,455,835 A | * | 12/1948 | Ushakoff .................... | 202/234 |
| 2,636,129 A | * | 4/1953 | Agnew ....................... | 159/904 |
| 3,257,291 A | * | 6/1966 | Gerber ........................ | 203/10 |
| 3,334,026 A | * | 8/1967 | Dobell ........................ | 203/10 |
| 3,986,936 A | * | 10/1976 | Rush ..................... | 203/DIG. 1 |
| 4,062,735 A | * | 12/1977 | Koff, Jr. ....................... | 203/10 |
| 4,131,513 A | * | 12/1978 | Green ........................ | 202/234 |
| 4,151,046 A | * | 4/1979 | Eidelberg .................. | 203/100 |
| 4,210,494 A | * | 7/1980 | Rhodes ................ | 203/DIG. 17 |
| 4,219,387 A | * | 8/1980 | Gruntman ................... | 159/904 |
| 4,235,221 A | * | 11/1980 | Murphy ..................... | 126/415 |
| 4,276,122 A | * | 6/1981 | Snyder ....................... | 202/234 |
| 4,363,703 A | * | 12/1982 | El Difrawi et al. .... | 203/DIG. 1 |
| 4,504,362 A | * | 3/1985 | Kruse ......................... | 203/11 |
| 4,693,304 A | * | 9/1987 | Volland ...................... | 203/100 |
| 5,348,622 A | * | 9/1994 | Deutsch et al. .......... | 202/267.1 |

FOREIGN PATENT DOCUMENTS

| | | |
|---|---|---|
| DE | 31 40 492 A1 | 6/1982 |
| DE | 34 15 909 C2 | 6/1987 |
| DE | 42 02 083 C2 | 1/1994 |
| DE | 43 18 949 C1 | 6/1994 |
| DE | 43 44 053 A1 | 7/1994 |
| DE | 195 05 027 C1 | 10/1996 |
| JP | 0135667 | * 10/1979 ................. 159/904 |

* cited by examiner

Primary Examiner—Virginia Manoharan

(57) ABSTRACT

A solar cell floats over a body of saline water. A submerged fresh water collection system underlies the cell. A partial vacuum is created in the solar cell for drawing water vapor from the cell to the collection system. Water vapor is condensed in a condenser disposed between the cell and the collection system. Heat generated by the condensation of water vapor is utilized to heat the salt water, which rises upwardly to replace the salt water vaporized in the cell.

14 Claims, 3 Drawing Sheets

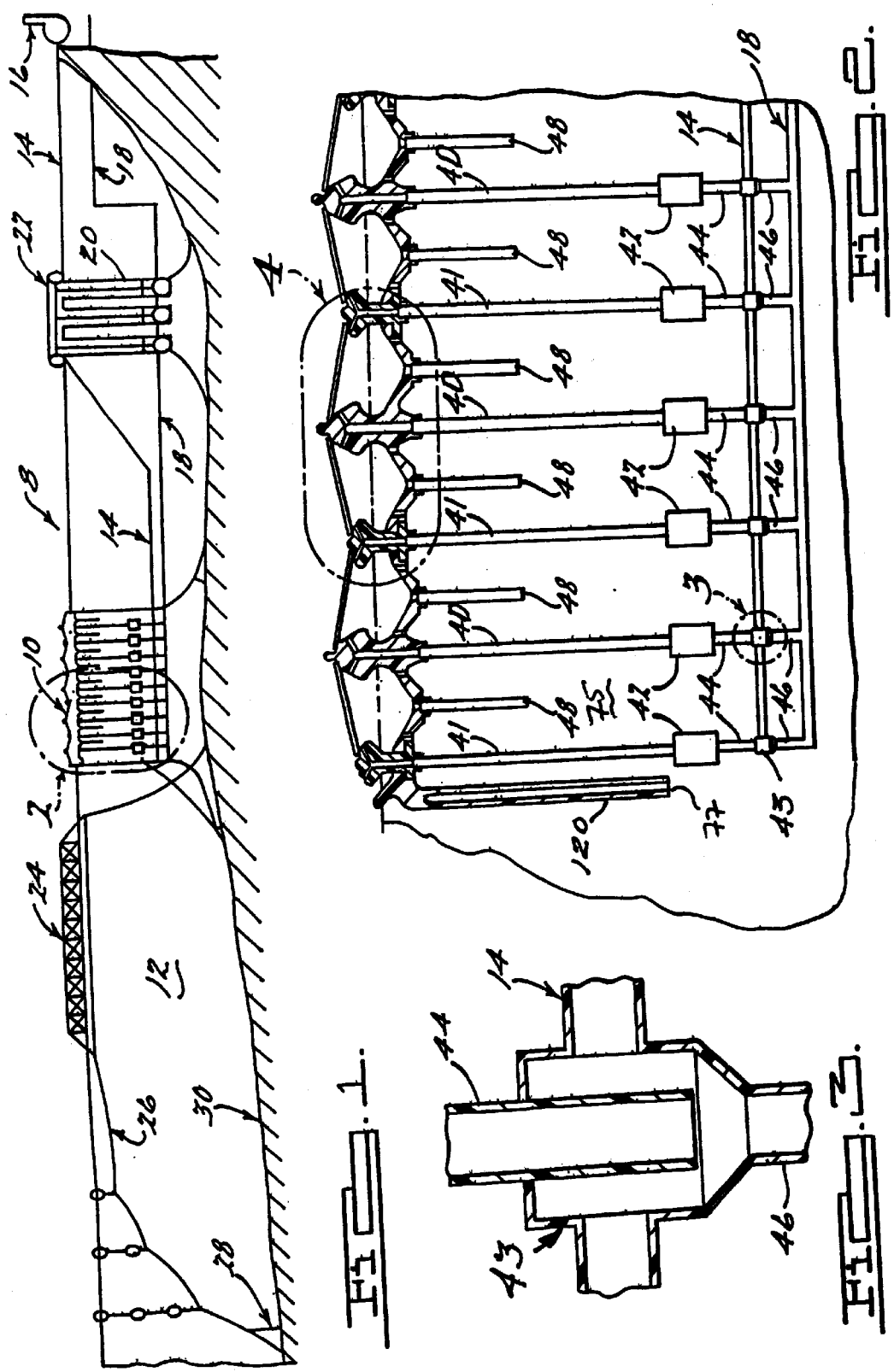

SOLAR DISTILLATION SYSTEM

This application is a continuation-in-part of application Ser. No. 08/989,538 filed Dec. 12, 1997 abandoned.

BACKGROUND OF THE INVENTION

It is well known that there is a worldwide shortage of fresh water. One solution to this problem is large scale desalination of sea water. However, conventional desalination systems are expensive, exhibit high energy consumption and are relatively inefficient.

For example, the distillation system taught in Kruse U.S. Pat. No. 4,594,362 does not make use of the heat consumed during evaporation of saline water by regaining it during condensation, significantly lowering efficiency.

Another system is disclosed in Eidelberg U.S. Pat. No. 4,151,046 which utilizes water vapor conducted from under a metal plate to a condenser. There is no provision for the induction of ambient air or water vapor to an airspace above a sea water containment panel which, like Kruse, comprises efficiency.

The patent to Green U.S. Pat. No. 4,131,513 does not disclose the use of an insulation perimeter to reduce loss of heat or the use of heat obtained solely from a solar source.

The patent to Miller U.S. Pat. No. 2,413,466 discloses a collector that collects fresh water but does not teach the use of a collector which condenses water vapor and regains the heat of condensation by transferring it to the surrounding salt water.

Accordingly, there is a need for a cost effective energy efficient system for producing fresh water from sea water or the like.

SUMMARY OF THE INVENTION

The solar distillation system of the present invention stores solar energy in sea water in the form of heat. The system utilizes the accumulated solar generated heat as well as the heat of condensation to increase the temperature of saline water internally of perimeter insulation surrounding a plurality of integrated solar cells.

More specifically, the solar distillation system of the present invention comprises multiple solar cells, the number of which is dictated by the required output of the system. The solar cells are joined to one another and to a network of heat exchangers, vacuum lines and fresh water collection conduits disposed below the surface of a body of sea water. The bulk of water vapor condensation takes place under the surface of the body of water. The solar cells are designed so that the upper extremities thereof float above the water level while the water vapor condensation and fresh water collection portions of the systems are submerged. The entire system is insulated from the adjoining body of sea water and is designed to move up or down with the tide. System position is maintained against change in the direction of water currents and/or wind by mooring cables.

The solar still of the present invention is different than known systems in many important respects, namely; (a) the system works day and night, during cloudy days and during the cold winter season due to the fact that heat is stored in the system. Temperatures approaching 100° C. are reached in the upper layers under the cells after four months of operation; (b) except for a means to produce a partial vacuum, there is no source of energy or equipment required to heat, circulate, or condense water vapor to produce fresh water other than solar energy; and, (c) the system is designed to produce huge quantities of fresh water out of saline water.

The aforesaid advantages are achieved by;

(1) Continuously heating the saline water to temperatures approaching the boiling point of saline water;

(2) Condensing water vapor in a collection system deep under the solar cells, for example, 40 feet;

(3) Storing heat in massive quantities at temperatures ranging from sea temperature to the boiling point of saline water;

(4) Eliminating the requirement for a pump, heating element or condenser coil;

(5) Utilizing the heat of solar radiation plus heat of vaporization;

and, (6) Utilizing humid air above the installation which is drawn into the system.

BRIEF DESCRIPTION OF THE DRAWINGS

FIG. 1 is an elevation of the solar distillation system of the present invention in its operating environment;

FIG. 2 is a view taken within the circle "2" of FIG. 1.

FIG. 3 is a cross-sectional view taken within the circle 3 of FIG. 2.

DETAILED DESCRIPTION OF THE PREFERRED EMBODIMENT(S)

Figure 4:
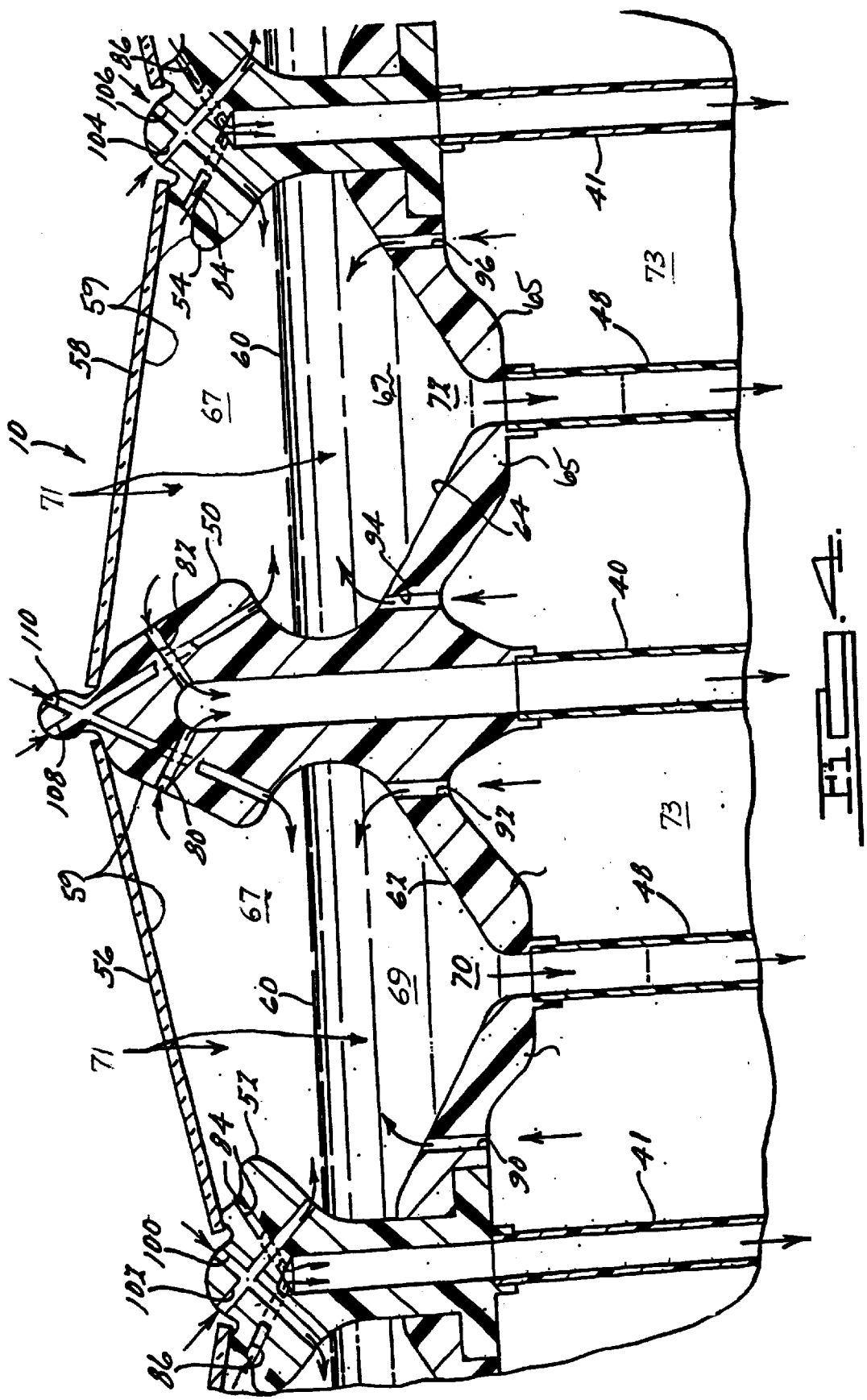
FIG. 4 is a cross-sectional view taken within the circle 4 of FIG. 2.
Figure 5:
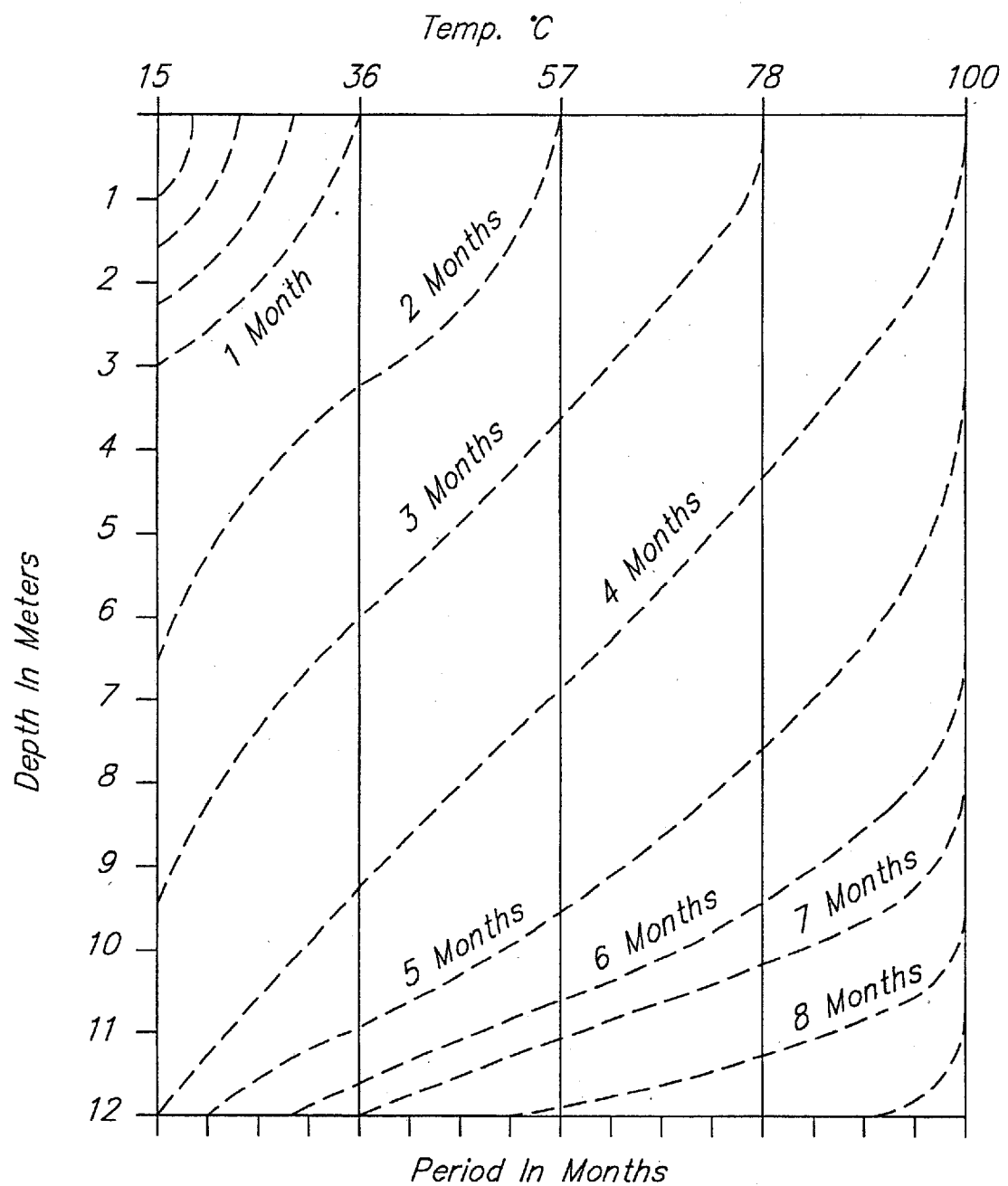
FIG. 5 is a graph showing heat gain in sea water in the disclosed system over time.

As seen in FIG. 1, a desalination system 8 utilizes a plurality of interconnected solar cells 10, each of which is of like configuration. The solar cells 10 are adapted to float over a body of water 12.

In accordance with one feature of the present invention, a pressure differential is maintained between ambient pressure externally of the cells 10 and water vapor pressure internally of the cells 10. This is accomplished by connecting a vacuum line 14 to each solar cell 10 and to the low pressure side of a vacuum pump or source 16.

In accordance with another feature of this invention, a distilled water collection conduit 18 is located below the vacuum line 14 for the conduction of fresh water condensate to a plurality of fresh water storage tanks 20. A service platform 22 is orientated over the tanks 20 for the housing of the vacuum pump 16, fresh water pumps, valves, etc.

When the solar distillation system 8 is deployed over a body of water 12 that is subject to wave action, a wave breaker 24 may be employed to protect the solar cells 10 from the waves. Suitable cables 26 and anchors 28 position the system 8 relative to the sea bed 30.

As seen in FIG. 2 each of the solar cells 10 is provided with downwardly extending water vapor extraction pipes 40 and 41 for the conduction of water vapor to a like plurality of condensers 42.

As seen in FIG. 3, the condensate output side of each condenser 42 is connected to the vacuum line 14 by conduits 44. Condensate pipes 46 are also connected to the output side of each condenser 42 and extend downwardly from the vacuum line 14 for connection to the horizontally orientated fresh water extraction conduit 18.

As seen in FIG. 4, each solar cell 10 is made of insulating material, for example, polyurethane foam encapsulated by PVC or the like to preclude attack by salt water. Each cell 10 comprises a pair of cool water return pipes 48 extending downwardly relative to a central pedestal 50. A pair of side pedestals 52 and 54 are disposed on opposite sides of the central pedestal 50. The central pedestal 50, side pedestals 52 and 54, and base portions 62, 64 support a pair of solar energy transparent upper panels 56 and 58 to form an enclosure 59. The cool water return pipes 48 are connected to the base portions 62 and 64 of a pair of truncated conical funnel like water chambers 70 and 72 on opposite sides of the pedestal 50 which aid in the circulation of water from each cell 10 downwardly through the pipes 48 into the body of water underlying the cell 10. The base portions 62, 64 form a lower panel 65 positioned below the water surface 60. The solar energy transparent upper panels 56 and 58 and the lower panel 65 are positioned to define an airspace 67 and a cavity 69. The cavity 69 is filled with a portion of the body of salt water 12. The airspace 67 and cavity 69 define an inner cell heating zone 71 within the enclosure 59.

In operation, when sunlight impinges on the cell 10, solar energy passes through the glass panels 56 and 58 so as to heat and evaporate the water inside the solar cell 10. The water vapor is then drawn through passages 80 and 82 in the pedestal 50, through the water vapor extraction pipes 40 to the condensers 42 due to the reduced pressure therein created by the vacuum pump or source 16. In addition, water vapor is drawn through passages 84 and 86 in each of the pedestals 52 and 54 through the water vapor extraction pipes 41 to the condensers 42 along with water that condenses on the lower face of the glass panels 56 and 58.

As water vapor moves down the vapor extraction pipes 40 and 41 under the influence of the vacuum pump or source 16, water continuously condenses in the pipes 40 and 41 as well as in condensers 42. Fresh water flows downwardly from the condenser 42 through a water/vapor separator 43, thence through the fresh water conduits 46 and 18 to the tanks 20. Heat generated by such condensation warms the sea water externally of the pipes 40 and 41 and condensers 42 creating an under cell heating zone 73 positioned below the enclosure 59.

The warmed sea water rises and finds its way through passages 90, 92, 94 and 96 (vertical salt water replenishment conduits) in the cell 10 thereafter rising to the water surface 60 where it is subjected to solar energy. When surface water in the cells 10 evaporates, the underlying water cools, causing it to sink through the pipes 48. This relatively saltier and cooler water is replaced by warmer water from under the cell 10 which rises through passages 90–96. Water lost due to evaporation is replaced by the incoming relatively warm water through the passages 90–96.

It is to be noted that hot, moist ambient air is drawn into the cell 10 through passages 100, 102, 104, 106, 108 and 110 so as to greatly increase efficiency of the solar cell 10. As the water vapor is drawn down the vapor extraction pipes 40 and 41 under the influence of the vacuum pump or source 16, a partial vacuum is created in the enclosure 59 that actively draws the ambient air into the cell 10 through passages 100, 102, 104, 106, 108 and 110. This in effect captures water vapor from surrounding sea water to further improve the efficiency of the present invention. The ambient moist air can retrieve rising heated water losses escaping from under the perimeter heat insulation barrier 120 as well as the vapor from naturally heated surrounding waters. Although the passages 100, 102, 104, 106, 108 and 110 may be formed in a variety of configurations, one embodiment contemplates directing the passages 100, 102, 104, 106, 108 and 110 at the surface of the portion of the body of salt water captured in the enclosure 59. This further helps draw the water vapor off the heated salt water 12 within the cavity 69 and improves the efficiency of the present invention.

As operation continues, heat will build up under the cell 10, bringing the upper film of water within the system 8 to an elevated temperature that facilitates evaporation of the sea water. Accordingly, it is essential to efficient operation of the system 8, that heat be retained within the system 8 by a perimeter heat insulator barrier 120 that extends downwardly to a level slightly above the condenser whereby relatively cool sea water surrounds the condensers 42. In this fashion, the perimeter heat insulation barrier 120 defines the under cell heating zone 73 below the enclosures. The under cell heating zone 73 having only a bottom face 77 open to the body of sea water 12. The under cell heating zone 73 is comprised of a column of sea water 75 positioned below the enclosure 59. The insulation barrier 120 surrounds only the sides of the column of sea water 75 while the bottom face 77 is open. The under cell heating zone 73 can store a mass of heated sea water 75. In the preferred embodiment, the barrier 120 is made of polyurethane or similar material covered with protective material such as PVC Savings.

I claim:

1. A floating solar cell for disposition on the surface of a body of salt water for producing fresh water therefrom comprising:

an enclosure having a solar energy transparent upper panel spaced upwardly from the surface of the salt water body so as to define an airspace thereabove, and a lower panel spaced below the surface of said salt water body so as to define a cavity filled with a portion of the body of salt water;

an insulating wall on the periphery of said enclosure extending downwardly therefrom into the body of salt water to encompass a column of sea water positioned beneath said enclosure;

a vertical water vapor conduit having an upper end communicating with the airspace in said enclosure and a lower end extending below said lower panel of said enclosure further into the body of salt water;

a vapor condenser, having a partial vacuum, connected to a lower end of said vapor conduit below a lower extremity of said insulating wall;

a fresh water conduit connected to a lower end of said condenser; and a vertical salt water replenishment conduit extending downwardly from said lower panel in said enclosure into the body of salt water internally of said insulating wall for conducting salt water heated by the heat of condensation in said condenser upwardly to the cavity of said enclosure.

2. A solar cell in accordance with claim 1 including a vent in said enclosure for admitting ambient air into the airspace therein.

3. A floating solar cell for disposition on the surface of a body of salt water for producing fresh water therefrom comprising:

an inner cell heating zone defined by an enclosure having a solar energy transparent upper panel spaced upwardly from the surface of the salt water body so as to define an airspace thereabove, and a lower panel spaced below the surface of said salt water body so as to define a cavity filled with a portion of the body of salt water;

an under cell heating zone below said inner cell heating zone, said under cell heating zone defined by an insulating wall on the periphery of said enclosure extending downwardly therefrom into the body of salt water, said insulating wall having an open bottom face;

a vertical water vapor conduit having an upper end communicating with the airspace in said enclosure and a lower end extending through said under cell heating zone, said vertical water vapor conduit heating the body of salt water located within said under cell heating zone;

a vapor condenser having a partial vacuum, connected to a lower end of said vapor conduit below a lower extremity of said insulating wall, said vapor condenser positioned below said under cell heating zone such that portions of the body of salt water heated by said vapor condenser will rise into said under cell heating zone;

a vertical salt water replenishment conduit extending downwardly from said inner cell heating zone into said under cell heating zone for conducting heated salt water from said under cell heating zone upwardly into said inner cell heating zone.

4. A solar cell in accordance with claim 3 including a vent in said enclosure for admitting ambient air into the airspace therein.

5. A solar cell in accordance with claim 4 wherein ambient air is actively drawn into said enclosure through said vent.

6. A solar cell in accordance with claim 5 wherein said ambient air is actively drawn into said enclosure in response to a partial vacuum in said enclosure.

7. A solar cell in accordance with claim 5 wherein said vent directs said ambient air towards the surface of said water body.

8. A solar cell in accordance with claim 3 further comprising:

a distilled water collection conduit in communication with said vapor condenser.

9. A solar cell in accordance with claim 8 further comprising:

a vacuum line in communication with said vapor condenser, said vacuum line positioned above said distilled water collection conduit.

10. A solar cell in accordance with claim 3 further comprising:

at least two pedestals supporting said solar energy transparent upper panel, said at least two pedestals forming said lower panel.

11. A solar cell in accordance with claim 3 further comprising:

a cool water return pipe extending downwardly from said inner cell heating zone into said under cell heating zone to a position below said vertical salt water replenishment conduit.

12. A solar cell in accordance with claim 11 wherein said lower panel forms a conical funnel chamber.

13. A solar cell in accordance with claim 12 wherein said cool water return pipe is connected to said conical funnel chamber.

14. A solar cell in accordance with claim 3 wherein said partial vacuum is created by a pump in communication with said vapor condenser.

* * * * *